(12) United States Patent
Lee (10) Patent No.: US 9,948,176 B2
(45) Date of Patent: Apr. 17, 2018

(54) STATIC VAR COMPENSATOR APPARATUS AND OPERATING METHOD THEREOF

(71) Applicant: LSIS CO., LTD., Anyang-si, Gyeonggi-do (KR)

(72) Inventor: Kyung Bin Lee, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/063,175

(22) Filed: Mar. 7, 2016

(65) Prior Publication Data

US 2017/0054362 A1 Feb. 23, 2017

(30) Foreign Application Priority Data

Aug. 19, 2015 (KR) .................. 10-2015-0116998

(51) Int. Cl.
*H02M 1/42* (2007.01)
*H02J 3/18* (2006.01)
*H02J 3/01* (2006.01)

(52) U.S. Cl.
CPC ......... *H02M 1/4208* (2013.01); *H02J 3/1828* (2013.01); *H02J 3/01* (2013.01); *Y02E 40/12* (2013.01); *Y02E 40/40* (2013.01)

(58) Field of Classification Search
CPC ....... H02M 2007/4835; H02M 1/4208; H02M 1/42; H02M 1/4216
See application file for complete search history.

(56) References Cited

U.S. PATENT DOCUMENTS

| | | | | |
|---|---|---|---|---|
| 4,686,447 A | * | 8/1987 | Takeda | H02J 3/1864 323/209 |
| 5,969,509 A | * | 10/1999 | Thorvaldsson | G05F 1/70 323/210 |
| 7,692,415 B2 | * | 4/2010 | Yasuda | G05F 1/70 307/105 |
| 8,848,403 B2 | * | 9/2014 | Hasler | H02J 3/1821 323/208 |

(Continued)

FOREIGN PATENT DOCUMENTS

| | | | |
|---|---|---|---|
| CN | 103475005 | * | 12/2013 |
| JP | 5190455 | | 8/1976 |

(Continued)

OTHER PUBLICATIONS

European Patent Office Application Serial No. 16159935.2, Search Report dated Nov. 25, 2016, 11 pages.

(Continued)

*Primary Examiner* — Kyle J Moody
(74) *Attorney, Agent, or Firm* — K&L Gates LLP (57) ABSTRACT

A static varr compensation apparatus including: a plurality of capacitor banks supplying three-phase alternating current (AC) power; a plurality of bidirectional thyristors opening and closing the plurality of capacitor banks; and a controller calculating an amount of reactive power necessary to be compensated and controlling the plurality of bidirectional thyristors to open and close the plurality of capacitor banks in correspondence to the calculated amount of reactive power, wherein the plurality of capacitor banks are in a structure of Y connection.

9 Claims, 9 Drawing Sheets

(56) References Cited

U.S. PATENT DOCUMENTS

| | | | | |
|---|---|---|---|---|
| 2010/0066317 A1* | 3/2010 | Angquist | ............... | H02J 3/1864 323/210 |
| 2010/0109616 A1* | 5/2010 | Li | ............... | G05F 1/70 323/210 |
| 2011/0181044 A1* | 7/2011 | Scott | ............... | H02J 3/1864 290/7 |
| 2015/0333500 A1* | 11/2015 | Boe | ............... | H02J 3/18 361/91.1 |
| 2016/0149481 A1* | 5/2016 | Hasler | ............... | H02M 1/4208 323/207 |
| 2017/0070135 A1* | 3/2017 | Nam | ............... | H02M 1/4208 |

FOREIGN PATENT DOCUMENTS

| | | |
|---|---|---|
| JP | S6358518 | 3/1988 |
| JP | S63120317 | 5/1988 |
| JP | H06261548 | 9/1994 |
| JP | 681011 | 11/1994 |
| JP | H07160346 | 6/1995 |
| JP | H08140268 | 5/1996 |
| JP | H09172739 | 6/1997 |
| JP | H11318032 | 11/1999 |
| JP | 2003339171 | 11/2003 |
| JP | 2010044621 | 2/2010 |
| JP | 2012175834 | 9/2012 |
| JP | 2013110884 | 6/2013 |
| KR | 101081792 | 11/2011 |
| KR | 1020120033636 | 4/2012 |
| KR | 1020130076112 | 7/2013 |

OTHER PUBLICATIONS

Korean Intellectual Property Office Application No. 10-2015-0116998, Office Action dated Aug. 19, 2015, 5 pages.

Tyll, et al., "Historical overview on dynamic reactive power compensation solutions from the begin of AC power transmission towards present applications," Power Systems Conference and Exposition, XP031450775, Mar. 2009, 7 pages.

Kulkarni et al., "ANN-Based SVC Switching at Distribution Level for Minimal-Injected Harmonics," IEEE Transactions on Power Delivery, IEEE Service Center, XP011311440, Jul. 2010, 8 pages.

* cited by examiner

STATIC VAR COMPENSATOR APPARATUS AND OPERATING METHOD THEREOF

CROSS-REFERENCE TO RELATED APPLICATION(S)

Pursuant to 35 U.S.C. § 119(a), this application claims the benefit of earlier filing date and right of priority to Korean Patent Application No. 10-2015-0116998, filed on Aug. 19, 2015, the contents of which are all hereby incorporated by reference herein in its entirety.

BACKGROUND

The present disclosure relates to a static var compensator apparatus and an operating method thereof and, more particularly, to a static var compensator apparatus, which changes a structure where a Thyristor Switched Capacitor (TSC) for compensation of reactive power is connected to a power system, and an operating method thereof.

It is necessary compensate for reactive power both in a direct current (DC) transmission system and in an alternating current (AC) transmission system for a purpose of transmission of power. The reactive power indicates power which is not actually used and does not consume heat. The reactive power travels back and forth between power and an electric device but does not cause occurrence of energy, so it cannot be used. If reactive power increases, voltages may be significantly lowered in its transmission and therefore power may be cut off. In order to prevent the above problems, it is necessary to compensate for the reactive power appropriately.

To this end, a reactive power compensator is used in a transmission system. The reactive power compensator may be classified into a Static VAR Compensator (SVC), which uses a thyristor element to compensate for reactive power, and a Static Synchronous Compensator (STATCOM) which uses an Insulated Gate Bipolar mode Transistor (IBGT) element.

A general SVC system may include a Thyristor Switched Capacitor (TSC) supplying reactive power and a Thyristor Controlled Reactor (TCR) absorbing reactive power. The SVC system adjusts reactive power of the TSC and the TCR to supply reactive power to a power system or absorb reactive power. By doing so, the SVC system controls voltages, a power factor, and the reactive power in order to control the whole system, thereby improving stability of the power system.

Figure 1:
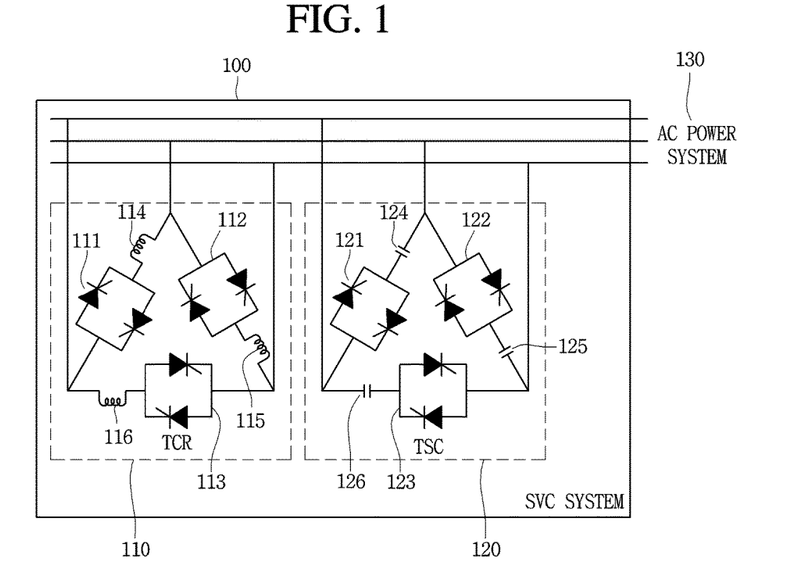
FIG. 1 is a circuit diagram illustrating connection of a Thyristor Controlled Reactor (TCR) and a Thyristor Switched Capacitor (TSC) configuring an existing Static VAR Compensator (SVR) system to a power system.

FIG. 1 is a diagram illustrating power system connection of a TCR and a TSC comprising an existing SVC system.

As illustrated in FIG. 1, an existing SVC system 100 may include a TCR 110 and a TSC 120.

The TCR 110 includes three bidirectional thyristors 111, 112, and 113, and three reactors 114, 115, and 116.

The three bidirectionial thyristors 111, 112, and 113 and the three reactors 114, 115, and 116 may be connected to an AC power system 130 in a structure of delta connection. In this case, each of the three bidirectional thyristors 111, 112, and 113, and the three reactors 114, 115, and 116 configures any one of three phases which generate three-phase AC.

The TCR 110 switches on and off the three bidirectional thyristors 111, 112, and 113 to absorb reactive power of the AC power system 130.

The TSC 120 are configured to include three bidirectional thyristors 121, 122, and 123, and three capacitors 124, 125, and 126.

The three bidirectional thyristors 121, 122, and 123, and the three capacitors 124, 125, and 126 may be connected to the AC power system 130 in a structure of delta connection. In this case, each of the three bidirectional thyristors 121, 122, and 123, and the three capacitors 124, 125, and 126 configures any one of three phases which generate three-phase AC.

The TSC 120 switches on and off the three bidirectional thyristors 121, 122, and 123 to supply reactive power to the AC power system 130.

Figure 2:
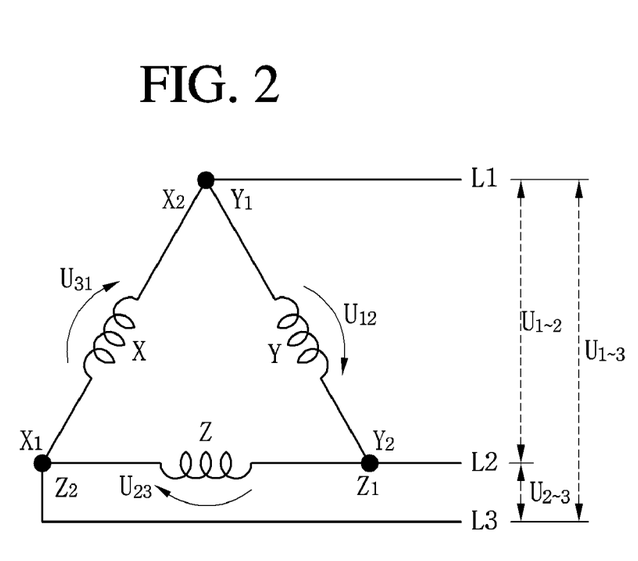
FIG. 2 is a diagram for explanation of a relation between a grid voltage and a voltage applied due to a configuration of the TSC in FIG. 1.

FIG. 2 is a diagram illustrating a relation between a grid voltage and a voltage applied due to a configuration of a TSC in FIG. 1.

A structure of delta connection is a structure in which one end of a coil connecting elements, such as a thyristor and a capacitor, is connected to one end of another coil, and a line drawn from a coil linking point is connected to a power system. A circuit configured in the structure of delta connection generates three-phase AC which indicates AC continuously occurring at 120 degree phase differential.

Referring to FIG. 2, one end X2 of a coil X is connected to one end Y1 of a coil Y. Another end Y2 of the coil Y is connected to one end Z1 of a coil Z, and the other end Z2 of the coil Z is connected to the other end X1 of the coil X.

In addition, the linking point of X2 and Y1 is connected to a power system L1 through a line, the linking point of Y2 and Z1 is connected to a power system L2 through a line, and the linking point of X1 and Z2 is connected to a power system L3 through a line.

A phase voltage Up is a voltage induced to each of the three coils. In FIG. 2, a phase voltage applied to the coil X is U31, a phase voltage applied to the coil Y is U12, and a phase voltage applied to the coil Z is U23.

A line voltage UL is a voltage applied to between lines which are adjacent to each other. In FIG. 2, a line voltage applied between a line L1 and a line L2 is U1~2, a line voltage applied between the line 2 and a line L3 is U2~3, and a line voltage applied between the line L1 and the line L3 is U1~3.

As illustrated in FIG. 2, a phase voltage is equal to a line voltage in a structure of delta connection. That is, the relation Up=UL is established. Therefore, a line voltage of a power system is applied to each phase voltage of the TSC.

Each of a TCR and a TSC which configure the existing SVC system is in a structure of delta connection. Because the TCR adjusts a firing signal to be applied to a thyristor, the TCR must be in a structure of delta connection.

In the case of the TSC, however, if a phase voltage of the TSC becomes high, a greater number of thyristor elements used in the TSC is required and therefore the price of the TSC may increase. In addition, if a phase voltage of the TSC becomes high, an insulating level of a capacitor may increases so a capacitor element may have a greater volume and thus the price of the TSC may go up. Furthermore, in this case, a voltage applied to each configurable device becomes to increase, reducing device stability.

SUMMARY

Embodiments of the present disclosure provides a static var compensator apparatus and an operating method thereof, wherein the static var compensator apparatus uses a TSC which is in a structure of Y connection, not in an existing structure of delta connection, to thereby reduce a phase voltage and an insulating level of the TSC and thus cut down the price of the TSC while improving device stability.

Technical objectives of the present disclosure are not limited to the aforementioned objectives, and those skilled in the art to which the following embodiments pertain can clearly understand other objectives although they are not mentioned in the following.

Embodiments provide a static var compensator apparatus including: a plurality of capacitor banks supplying three-phase alternating current (AC) power; a plurality of bidirectional thyristors opening and closing the plurality of capacitor banks; and a controller calculating an amount of reactive power necessary to be compensated and controlling the plurality of bidirectional thyristors to open and close the plurality of capacitor banks in correspondence to the calculated amount of reactive power, wherein the plurality of capacitor banks are in a structure of Y connection.

Embodiments provide A static reactive power compensation system, including: a Thyristor Controlled Reactor (TCR) absorbing reactive power; and a Thyristor Switched Capacitor (TSC) supplying the reactive power, wherein the TSC includes: a plurality of capacitor banks connected in a structure of Y connection and supplying three-phase alternating current (AC) power according to an open/closed state; a plurality of bidirectional thyristors opening and closing the plurality of capacitor banks; and a controller calculating an amount of reactive power necessary to be compensated and opening and closing the plurality of capacitor banks in correspondence to the calculated amount of reactive power.

Embodiments provide an operating method of a static reactive power compensator which includes a plurality of capacitor banks connected in a structure of Y connection, the method including: calculating an amount of reactive power necessary to be compensated: supplying three-phase alternate current (AC) power by opening and closing the plurality of capacitor banks in correspondence to the calculated amount of reactive power.

An operating method of a static reactive power compensation system which includes a Thyristor Switched Capacitor (TSC) being in a structure of Y connection, the method including: calculating an amount of reactive power necessary to be compensated; in correspondence to the calculated amount of reactive power, absorbing reactive power or supplying reactive power through the TSC; and absorbing harmonics occurring in the static reactive power compensation system.

DETAILED DESCRIPTION

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Terms employed throughout the disclosure have the meanings commonly used in the art, and terms arbitrary selected by the inventor are also used. In the latter case, the meanings thereof are described in detail in the detailed description. Thus, the present disclosure should be understood based on the meanings of the terms. In the following description, the terms "comprises" and/or "comprising" as used herein will be understood to mean that the list following is non-exhaustive and may or may not include any other additional suitable items, for example one or more further component(s), operation(s), procedure(s), and/or element(s) as appropriate.

Figure 3:
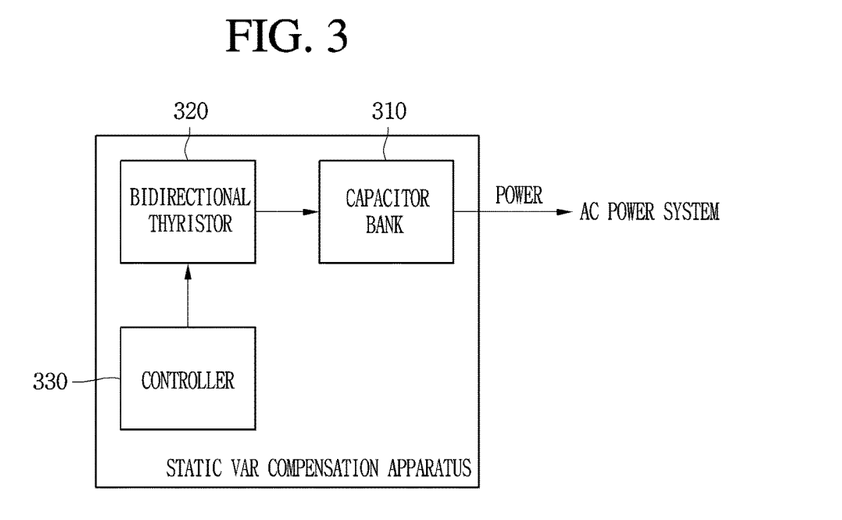
FIG. 3 is a diagram illustrating a configuration of a static var compensator apparatus according to an embodiment of the present disclosure.

FIG. 3 is a diagram illustrating a configuration of a static var compensator apparatus according to an embodiment of the present disclosure.

A static var compensator apparatus 300 according to an embodiment of the present disclosure may include a plurality of capacitor banks 310, a plurality of bidirectional thyristors 320, and a controller 330.

According to an open/closed state of the plurality of capacity banks 310, three-phase alternative current (AC) power is supplied.

A capacitor bank 310 is a large-capacity capacitor for accumulating electrical energy, and may include a plurality of capacitors. A capacitor is an element consisting of two electrodes and a dielectric between the two electrode, and stores electrical energy.

The plurality of capacitors 310 may be Y-connected to a power system

In the above structure of Y connection, one end of each of three coils generating three-phase alternating current (AC) is connected to configure one neutral point, and the other end of each of the three coils is connected to the power system. The structure of Y connection is described in detail with reference to FIGS. 5 and 6.

The plurality of bidirectional thyristors 320 open and close the plurality of capacitor banks 310.

Each bidirectional thyristor 320 is in a structure where two thyristors are connected in reverse parallel and accordingly a current may flow in two directions in a switch-on state.

A thyristor is PNPN four layers of semiconductor structure, and switched on and off to allow and block a current flow. In a case where an anode is positive relative to its cathode, if a sufficient current flows on a gate, electrical connection is established. Once the electrical connection is established, the thyristor is not switched off as long as an anode voltage is set to 0.

The controller 330 calculates reactive power to be compensated, and controls the plurality of bidirectional thyristors 320 to open and close the plurality capacitor banks 310 in correspondence to the calculated amount of reactive power.

Figure 4:
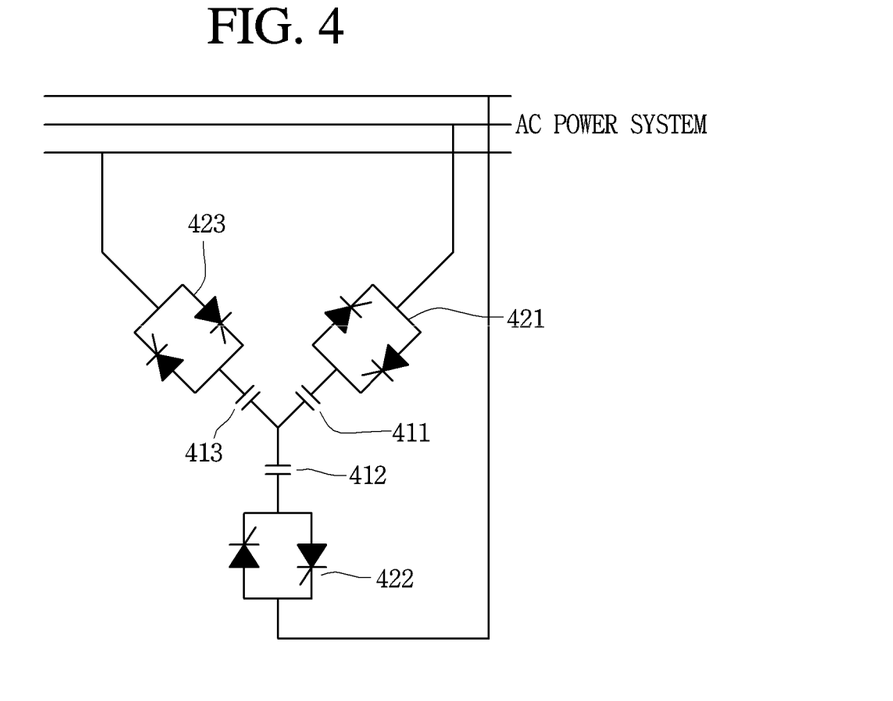
FIG. 4 is a circuit diagram illustrating connection of a static var compensator apparatus according to an embodiment of the present disclosure to a power system.

FIG. 4 is a circuit diagram illustrating connection of a static VAR compensator apparatus according to an embodiment of the present disclosure to a power system.

The static VAR compensator apparatus according to an embodiment of the present disclosure is in a structure of Y connection to a power system in order to reduce a phase voltage applied to the static VAR compensator apparatus.

Referring to FIG. 4, three coils connecting a plurality of capacitor banks 411, 412, and 413 and a plurality of bidirectional thyristors 421, 422, and 423 are arranged in a structure of Y connection. In addition, one end of each of the three coils is connected to configure one neutral point, and the other end of each of the three coils is connected to an AC power system.

For convenience of explanation, FIG. 4 shows an example in which the three capacitor banks 411, 412, and 413 and the three bidirectional thiristors 421, 422, and 423 are provided, but the configuration may be different according to system design.

Figure 5:
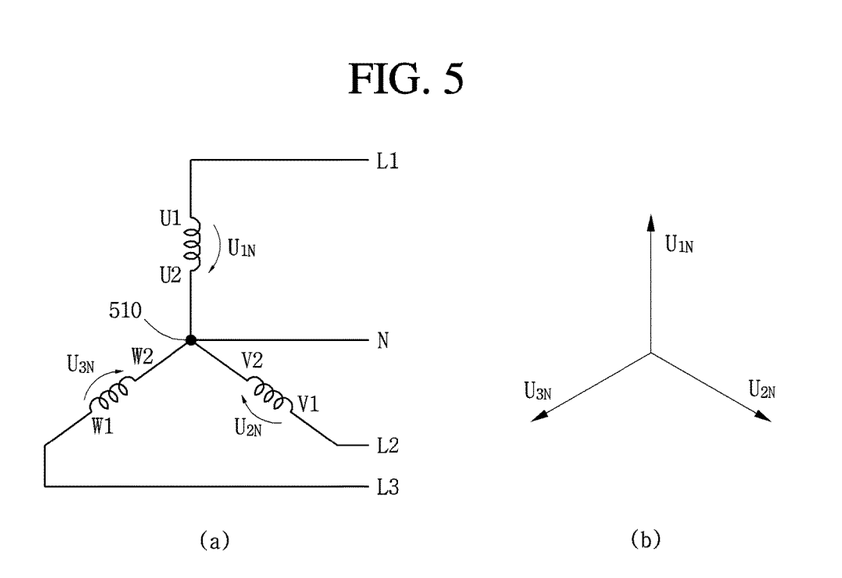
FIG. 5 is a diagram illustrating how a static var compensator apparatus according to an embodiment of the present disclosure is connected in a structure of Y connection.

FIG. 5 is a diagram for explaining a method of Y-connection of a static VAR compensator apparatus according to an embodiment of the present disclosure.

Referring to (a) on the left side of FIG. 5, U2, V2, and W2 each of which is one end of each coil are connected at a neutral point N (or a common point) 510. In addition, three lines drawn from U1, V1, and W1, each of which is the other end of each coil, are connected to lines L1, L2, and L3, respectively. Due to this configuration, a three-phase AC occurs.

A voltage between U1 and V1, between V1 and W1, or between W1 and U1 is called a line voltage UL. In this case, U12, U23, and U31 are the line voltage UL.

A voltage between U1 and the neutral point N 510, between V1 and the neutral point N 510, or between W1 and the neutral point N 510 is called a phase voltage $U_p$. In this case, U1N, U2N, and U3N are the phase voltage $U_p$.

Referring to (b) on the right side of FIG. 5, a phase voltage applied to each phase of a three-phase AC is illustrated. In a structure of delta connection, a line voltage is applied to a phase voltage. In the present disclosure, however, if a plurality of capacitors are in a structure of Y connection, the phase voltage becomes lower than the line voltage. Hereinafter, the principle of how the phase voltage is lowered is described with reference to FIG. 6.

Figure 6:
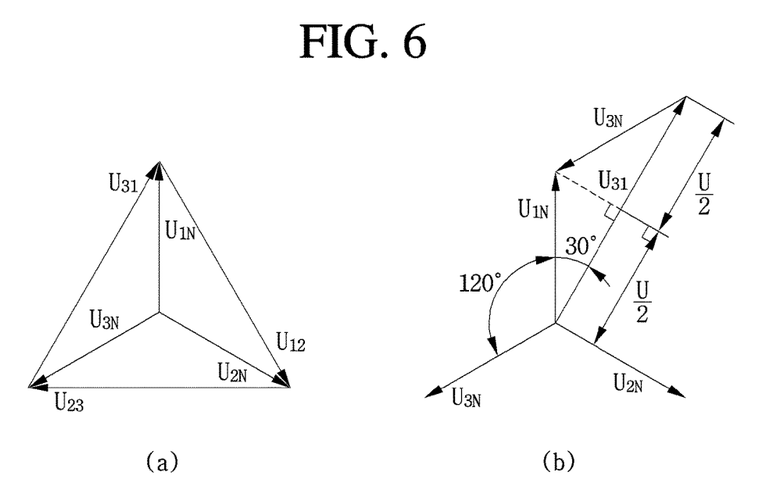
FIG. 6 is a diagram for explanation of a relation between a line voltage and a phase voltage applied due to a configuration of a static var compensator apparatus in FIG. 5.

FIG. 6 is a diagram for explanation of a relation between a line voltage and a phase voltage applied due to a configuration of a static VAR compensator apparatus in FIG. 5.

Referring to (a) on the left side of FIG. 6, phase voltages of three phases are $U_{1N}$, $U_{2N}$, and $U_{3N}$, respectively, and line voltages of the three phases are $U_{12}$, $U_{23}$, and $U_{31}$, respectively.

In this case, the relation $U_{31}=U_{1N}-U_{3N}$ is established by vector computation.

That is, the formula $U_{1N}=U_{31}+U_{3N}$ is valid.

Based on this, a relation between a line voltage and a phase voltage may be achieved with vector computation and a cosine function in (b) on the right side of FIG. 6.

Referring to (b) on the right side of FIG. 6, a relation between a line voltage ($U_L$: $U_{12}$, $U_{23}$, $U_{31}$) and a phase voltage ($U_p$: $U_{1N}$, $U_{2N}$, $U_{3N}$) is represented as in the following formula:

$$U_L = 2 \cdot U_P \cdot \cos 30° = 2 \cdot \cos 30° \cdot U_P = \sqrt{3} U_P \approx 1.73 U_P \quad \text{[Formula 1]}$$

In this case, $\sqrt{3} \approx 1.73$, so the phase voltage $U_p$ is reduced to 1/1.73 times the line voltage $U_L$. Accordingly, it is possible to reduce a phase voltage which is to be applied to a static VAR compensator apparatus.

If a Thyristor Switched Capacitor (TSC) is connected to a power system in an existing structure of delta connection, a phase voltage equal to a line voltage is applied to each phase of the TSC.

However, if a TSC is connected to a power system in a structure of Y connection which is proposed in the present disclosure, a voltage applied to each phase of the TSC may be reduced to 1/1.732 times to the line voltage.

The higher the phase voltage is applied to a phase configuring a three-phase AC, the more thyristor elements the static VAR compensator needs to use. In addition, if a high phase voltage is applied to a phase, an insulating level of a capacitor becomes to increase and therefore a capacitor element may have a greater volume.

Therefore, in a case where a TSC is connected to a power system in a structure of Y connection according to an embodiment of the present disclosure, the number of thyristor elements and the volume of a capacitor element are reduced, so that the price of the TSC may be also reduced.

Figure 7:
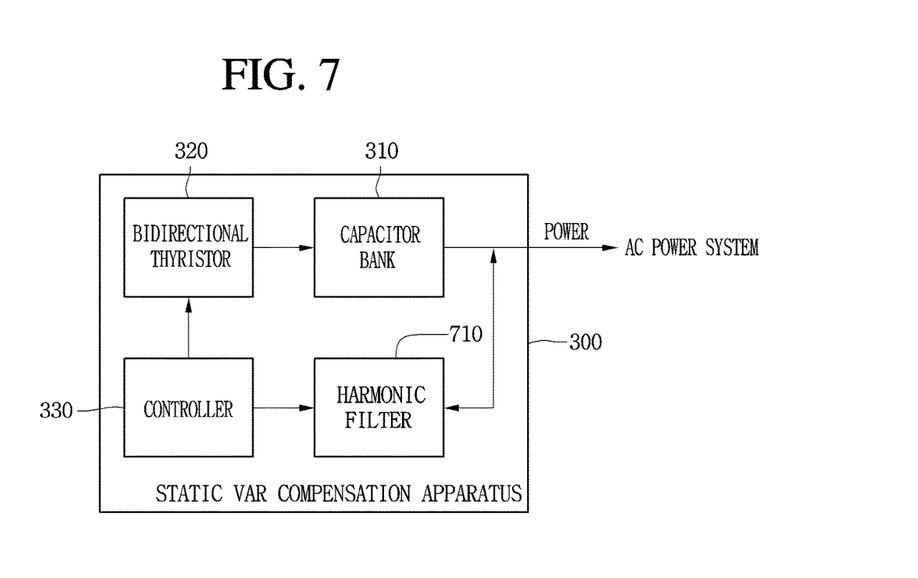
FIG. 7 is a diagram illustrating a configuration of a static var compensator apparatus according to another embodiment of the present disclosure.

FIG. 7 is a diagram illustrating a configuration of a static var compensator apparatus according to another embodiment of the present disclosure.

A static var compensator apparatus 300 according to another embodiment of the present disclosure may include a plurality of capacitor banks 310, a plurality of bidirectional thyristors 320, a controller 330, and a harmonic filter 710.

The plurality of capacitor banks 310, the plurality of bidirectional thyristors 320, and the controller 330 perform functions identical or similar to those of elements described in FIG. 3, so that those functions already described above are hereinafter not described again.

The harmonic filter 710 absorbs specific harmonics, thereby filtering harmonics which may occur while the static var compensator apparatus 300 is driven. According to characteristics of the static var compensator apparatus 300, a plurality of harmonic filters 710 may be included.

The harmonic filter 710 may be a passive filter or an active filter. The passive filter consists of a reactor, a capacitor, and a resistor, and the active filter consists of an active element.

The harmonic filter 710 may be connected to one end of the plurality of capacitor banks 310.

In this case, a switch may be inserted between the harmonic filter 710 and the plurality of capacitor banks 310. The switch may be a mechanic switch or a transistor. If the switch is a transistor, it may be a metal-oxide-semiconductor field effect transistor (MOSFET) or Insulated Gate Bipolar Transistor (IGBT) element.

Alternatively, a switch may be inserted in each of the plurality of harmonic filters 710.

According to an open/closed state, the switch transmits power to the harmonic filter 710 or block transmission of power thereto.

The controller 330 may calculate an amount of harmonics occurring during operation of the static var compensator apparatus 300, and control the harmonic filter 710 to filter harmonics based on the calculated amount.

Specifically, the controller 330 may control transmission of power to the harmonic filter 710 by opening and closing the aforementioned switch, and, at the same time, control the harmonic filter 710 to absorb harmonics.

Most of the harmonics occur in a Thyristor Controlled Reactor (TCR), so an existing TSC included in a static VAR (volt ampere reactive) compensator (SVC) system does not include a harmonic filter. In order to offset partial harmonics without an additional harmonic filter, the TSC is generally arranged in a structure of delta connection.

However, a static var compensator apparatus according to another embodiment of the present disclosure is Y-connected to a power system and include a harmonic filter.

Accordingly, as a TSC is configured to include a harmonic filter which is conventionally connected to the TSC in parallel and separate from the TSC, it is possible to reduce the volume of the SVC system and reduce the space occupied by the SVC system.

In addition, the TSC performs functions of the harmonic filter, so it is possible to reduce costs which are required to install the harmonic filter in the existing SVC system.

Figure 8:
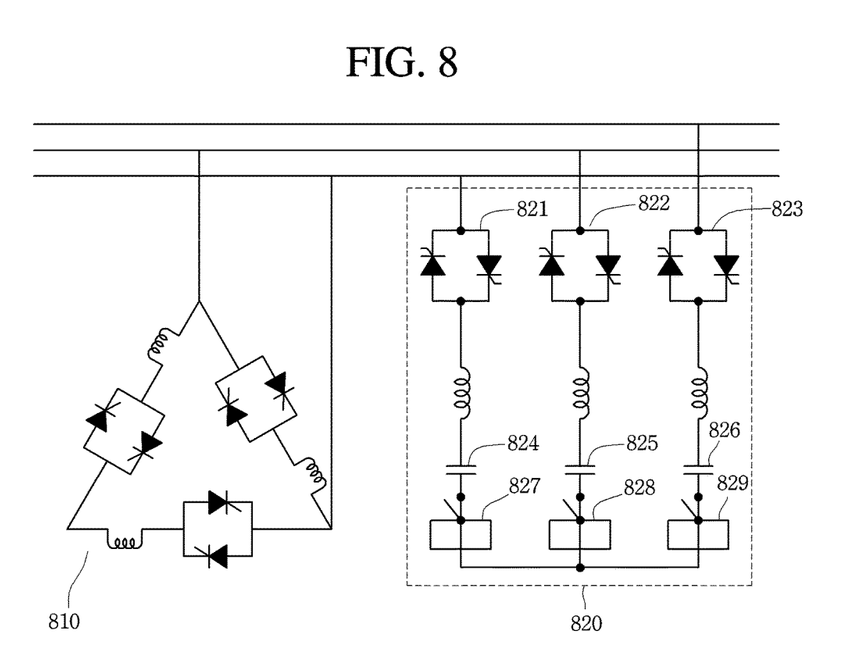
FIG. 8 is a diagram illustrating a configuration of a static var compensation system according to an embodiment of the present disclosure.

FIG. 8 is a diagram illustrating a configuration of a static var compensation system according to an embodiment of the present disclosure.

The SVC system is connected to lines in parallel, and opens and closes a capacitor bank or a combination of the capacitor bank/capacitor bank and a reactor at a high speed by a thyristor to thereby generate or absorb reactive power in an attempt to control the reactive power. To this end, the SVC system may include a TCR 810 and TSC 820.

Meanwhile, according to system design, the SVC system my further include a mechanic switching compensator (not shown), a mechanic switching capacitor (not shown), and an electric transformer.

The TCR 810 switches on and off a thyristor so as to absorb reactive power of an AC power system. Specifically, if reactive power transferred from a power system is greater than a specific level, the TCR 810 may absorb an amount of reactive power exceeding the specific level.

To this end, the TCR 810 controls a phase of a current flowing in a reactor. In this case, the current flowing in the reactor is distorted and therefore harmonics occur. Thus, a harmonic filter able to filter harmonics occurring in the TCR 810 is needed, and, in this embodiment, such a harmonic filter is included in the TSC 820.

The TSC 820 is a three-phase assembly, which may be connected to a power system in a structure of Y connection.

By switching on and off a thyristor, the TSC 820 opens and closes a capacitor to thereby supply reactive power to an AC power system. Specifically, if reactive power transferred from the power system is smaller than a specific level, the TSC 820 supply an amount of reactive power falling short of the specific level.

To this end, the TSC 820 may include bidirectional thyristors 821, 822, and 823, capacitor banks 824, 825, and 826, and harmonic filters 827, 828, and 829, wherein the bidirectional thyristors 821, 822, and 823 are connected to the respective capacitor banks 824, 825, and 826, and the respective harmonic filters 827, 828, and 829.

Opening and closing the capacitor banks 824, 825, and 826 are determined by switching on and off the bidirectional thyristors 821, 822, and 823.

In addition, the TSC 820 may further include small reactors 831, 832, and 833. A small reactor 831, 832, and 833 is used to limit switching transients and block the influence of harmonics and inrush currents occurring in a different reactive power compensator and a power system which are connected in parallel.

The harmonic filters 827, 828, and 829 filters harmonics which may occur while an SVC system is driven. According to characteristics of the SVC system, the SVC system may include a plurality of harmonic filters 827, 828, and 829.

The harmonic filters 827, 828, and 829 may be connected to one end of the plurality of capacitor banks 824, 825, and 826. In this case, switches may be inserted between the harmonic filters 827, 828, and 829 and the plurality of capacitor banks 824, 825, and 826. Alternatively, a switch may be inserted into each of the harmonic filters 827, 828, and 829. According to an open/closed state, the switches may transmit power to the harmonic filters 827, 828, and 829 or block transmission of power thereto.

Figure 9:
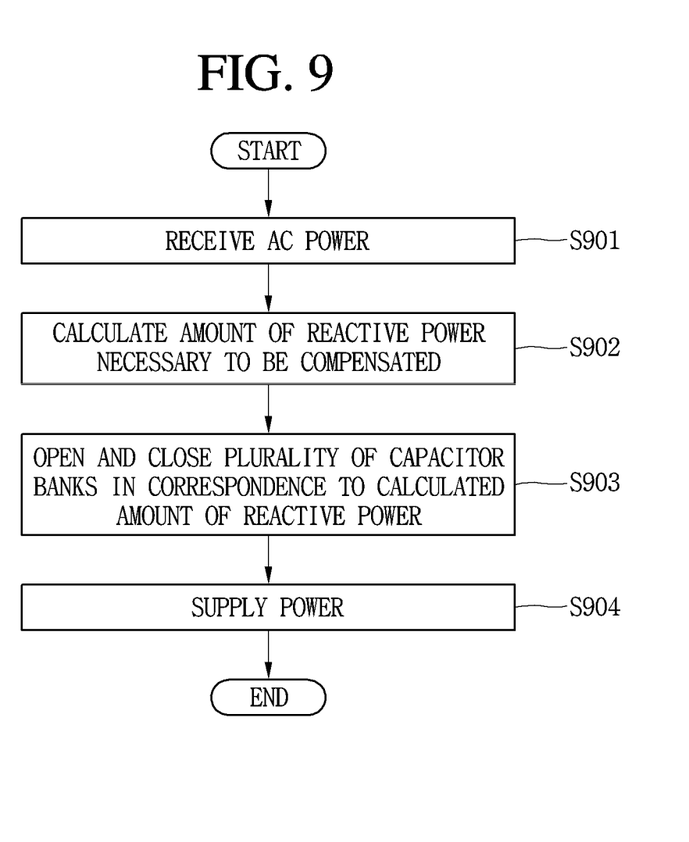
FIG. 9 is a diagram illustrating how to compensate for static reactive power according to an embodiment of the present disclosure.

FIG. 9 is a diagram illustrating a method for compensating static reactive power according to an embodiment of the present disclosure.

A static var compensator apparatus 300 receives AC power from a power system (S901).

The static var compensator apparatus 300 calculates an amount of reactive power necessary to be compensated (S902). In this case, the static var compensator apparatus 300 may determine the amount of reactive power based on the received AC power and load characteristics.

The static var compensator apparatus 300 opens and closes the plurality of capacitor banks in correspondence to the calculated amount of reactive power (S903).

The static var compensator apparatus 300 supplies reactive power (S904).

According to embodiments of the present disclosure, a voltage applied to one phase of a TSC may be reduced, which may make it possible to reduce the number of thyristor elements used in the TSC and the price of the TSC. In addition, if a phase voltage of the TSC is lowered, an insulating level of a capacitor used in the TSC may be lowered, which may resulting in reduction in a volume of a capacitor element, the price of the TSC, and an installation space.

Furthermore, a lower voltage is applied to each configurable device, so that device stability may improve.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A static var compensation apparatus comprising:
   a plurality of capacitor banks configured to supply three-phase alternating current (AC) power;
   a plurality of bidirectional thyristors configured to open and close the plurality of capacitor banks; and
   a controller configured to calculate an amount of reactive power necessary to be compensated and control the plurality of bidirectional thyristors to open and close the plurality of capacitor banks in correspondence to the calculated amount of reactive power,
   wherein:
   the plurality of capacitor banks are connected in a Y-shaped connection, the static var compensation apparatus is a thyristor-switched capacitor (TSC) unit, the TSC unit comprises the plurality of capacitor banks, the plurality of bidirectional thyristors, and a plurality of harmonic filters configured to absorb harmonics, the plurality of harmonic filters are connected to the plurality of capacitor banks, a corresponding switch of a plurality of switches is positioned between the plurality of harmonic filters and the plurality of capacitor banks, wherein the plurality of switches are configured to allow or block transmission of power to the plurality of harmonic filters, and the controller is further configured to calculate an amount of harmonics occurring during operation of the static var compensator apparatus and control transmission of power to the plurality of harmonic filters by opening and closing the plurality of switches based on the calculated amount.

2. The static var compensation apparatus of claim 1, wherein the Y-shaped connection is a structure in which a first end of each of three coils generating a three-phase AC is connected to configure one neutral point, and a second end of each of the three coils is connected to a power system.

3. The static var compensation apparatus of claim 1, wherein each of the plurality of bidirectional thyristors is configured in a structure in which two thyristors are connected in reverse parallel and cause a current to flow in both directions according to an on/off state.

4. The static var compensation apparatus of claim 1, wherein the Y-shaped connection is a structure in which a first end of each of the plurality of capacitor banks is connected to configure one neutral point and a second end of each of the plurality of capacitor banks is connected to the power system.

5. A static var compensation system, comprising:
a thyristor-controlled reactor (TCR) unit configured to absorb reactive power; and
a thyristor-switched capacitor (TSC) unit configured to supply the reactive power;
wherein the TSC unit comprises:
a plurality of capacitor banks connected in a Y-shaped connection and configured to supply three-phase alternating current (AC) power according to an open/closed state;
a plurality of bidirectional thyristors configured to open and close the plurality of capacitor banks;
a controller configured to calculate an amount of reactive power necessary to be compensated and control the plurality of bidirectional thyristors to open and close the plurality of capacitor banks in correspondence to the calculated amount of reactive power; and
a plurality of harmonic filters configured to absorb harmonics,
wherein:
the plurality of harmonic filters are connected to the plurality of capacitor banks;
a corresponding switch of a plurality of switches is positioned between the plurality of harmonic filters and the plurality of capacitor banks, wherein the plurality of switches are configured to allow or block transmission of power to the plurality of harmonic filters; and
the controller is further configured to calculate an amount of harmonics occurring during operation of the static var compensator system and control transmission of power to the plurality of harmonic filters by opening and closing the plurality of switches based on the calculated amount.

6. The static var compensation system of claim 5, wherein the Y-shaped connection is a structure in which a first end of each of three coils generating three-phase AC is connected to configure one neutral point and a second end of each of the three coils is connected to a power system.

7. The static var compensation system of claim 5, wherein each of plurality of the bidirectional thyristors is configured in a structure in which two thyristors are connected in reverse parallel and allows a current to flow in both directions according to an on/off state.

8. The static var compensation system of claim 5, wherein the structure of the Y-shaped connection is a structure in which a first end of each of the plurality of capacitor banks is connected to configure one neutral point, and a second end of each of the plurality of capacitor banks is connected to a power system.

9. An operating method of a static var compensation system which comprises a thyristor-switched capacitor (TSC), the method comprising:
calculating an amount of reactive power necessary to be compensated;
in correspondence to the calculated amount of reactive power, absorbing reactive power or supplying reactive power through the TSC; and
absorbing harmonics occurring in the static var compensation system,
wherein:
the TSC comprises the plurality of capacitor banks, the plurality of bidirectional thyristors, and a plurality of harmonic filters configured to absorb harmonics;
the plurality of capacitor banks are connected in a Y-shaped connection;
the plurality of harmonic filters are connected to the plurality of capacitor banks;
a corresponding switch of a plurality of switches is positioned between the plurality of harmonic filters and the plurality of capacitor banks, wherein the plurality of switches are configured to allow or block transmission of power to the plurality of harmonic filters; and
absorbing the harmonics comprises calculating an amount of harmonics occurring during operation of the static var compensator system and controlling transmission of power to the plurality of harmonic filters by opening and closing the plurality of switches based on the calculated amount.

* * * * *